United States Patent
Zheng et al.

(10) Patent No.: US 8,523,312 B2
(45) Date of Patent: Sep. 3, 2013

(54) DETECTION SYSTEM USING HEATING ELEMENT TEMPERATURE OSCILLATIONS

(75) Inventors: Xuan Zheng, Savage, MN (US); Timothy William Stoebe, Minnetonka, MN (US)

(73) Assignee: Seagate Technology LLC, Cupertino, CA (US)

( * ) Notice: Subject to any disclaimer, the term of this patent is extended or adjusted under 35 U.S.C. 154(b) by 278 days.

(21) Appl. No.: 12/941,461

(22) Filed: Nov. 8, 2010

(65) Prior Publication Data
US 2012/0113207 A1 May 10, 2012

(51) Int. Cl.
*G11B 21/21* (2006.01)

(52) U.S. Cl.
USPC .............................. 347/19; 369/75

(58) Field of Classification Search
USPC ................... 360/69, 75; 347/5, 19
See application file for complete search history.

(56) References Cited

U.S. PATENT DOCUMENTS

| | | | |
|---|---|---|---|
| 5,025,341 A | 6/1991 | Bousquet et al. | |
| 5,080,495 A * | 1/1992 | Hashimoto et al. | 374/43 |
| 5,561,896 A | 10/1996 | Voegeli et al. | |
| 5,576,745 A | 11/1996 | Matsubara | |
| 5,689,292 A | 11/1997 | Suzuki et al. | |
| 5,691,867 A | 11/1997 | Onuma et al. | |
| 5,901,001 A | 5/1999 | Meyer | |
| 5,991,113 A | 11/1999 | Meyer et al. | |
| 6,024,430 A | 2/2000 | Koitabashi et al. | |
| 6,052,243 A | 4/2000 | Shimada | |
| 6,052,249 A | 4/2000 | Abraham | |
| 6,071,007 A | 6/2000 | Schaenzer | |
| 6,125,008 A | 9/2000 | Berg | |
| 6,178,157 B1 | 1/2001 | Berg | |
| 6,181,520 B1 | 1/2001 | Fukuda | |
| 6,262,858 B1 | 7/2001 | Sugiyama et al. | |
| 6,265,869 B1 | 7/2001 | Takahashi | |
| 6,359,746 B1 | 3/2002 | Kakekado | |
| 6,366,416 B1 | 4/2002 | Meyer | |
| 6,501,606 B2 | 12/2002 | Boutaghou | |
| 6,552,880 B1 | 4/2003 | Dunbar | |
| 6,577,466 B2 | 6/2003 | Meyer | |
| 6,594,104 B2 | 7/2003 | Tokuyama et al. | |
| 6,600,622 B1 | 7/2003 | Smith | |

(Continued)

FOREIGN PATENT DOCUMENTS

| | | |
|---|---|---|
| EP | 0752700 | 1/1997 |
| EP | 1850333 | 10/2007 |
| JP | 2003-297029 | * 10/2003 |

OTHER PUBLICATIONS

Machine-generated translation of JP 2003-297029, published on Oct. 2003.*

(Continued)

*Primary Examiner* — Huan Tran
(74) *Attorney, Agent, or Firm* — Hollingsworth Davis, LLC

(57) ABSTRACT

A data storage system includes a recording head and a compensating resistor. The recording head has a heating element. The compensating resistor is in electrical series with the heating element and is external to the recording head. A method includes applying an alternating current at a first angular frequency to a recording head. A voltage drop across the recording head heating element is measured. A component of the voltage drop is extracted. The component has a frequency that is three times the frequency of the first angular frequency.

19 Claims, 6 Drawing Sheets

(56) References Cited

U.S. PATENT DOCUMENTS

| | | |
|---|---|---|
| 6,603,619 B1 | 8/2003 | Kojima et al. |
| 6,662,623 B2 | 12/2003 | Baumgartner |
| 6,666,076 B2 | 12/2003 | Lin |
| 6,692,848 B2 | 2/2004 | Ohtani |
| 6,697,223 B2 | 2/2004 | Lewis |
| 6,700,724 B2 | 3/2004 | Riddering |
| 6,771,453 B2 | 8/2004 | Baumgartner |
| 6,776,176 B1 | 8/2004 | Kino |
| 6,785,081 B2 | 8/2004 | Chapin |
| 6,788,500 B2 | 9/2004 | Baril et al. |
| 6,958,871 B2 | 10/2005 | Hirano |
| 6,967,805 B1 | 11/2005 | Hanchi et al. |
| 7,006,336 B2 | 2/2006 | Coffey et al. |
| 7,064,659 B2 | 6/2006 | Baumgartner |
| 7,068,457 B2 | 6/2006 | Riddering |
| 7,092,195 B1 | 8/2006 | Liu et al. |
| 7,099,096 B2 | 8/2006 | Ueyanagi |
| 7,130,141 B2 | 10/2006 | Chey et al. |
| 7,180,692 B1 | 2/2007 | Che |
| 7,194,802 B2 | 3/2007 | Fayeulle |
| 7,199,960 B1 | 4/2007 | Schreck |
| 7,233,451 B2 | 6/2007 | Baumgart |
| 7,262,936 B2 | 8/2007 | Hamann et al. |
| 7,265,922 B2 | 9/2007 | Biskeborn et al. |
| 7,278,902 B1 | 10/2007 | Kurita |
| 7,310,197 B2 | 12/2007 | Baumgart |
| 7,310,198 B2 | 12/2007 | Baumgart |
| 7,312,941 B2 | 12/2007 | Hirano |
| 7,362,535 B2 | 4/2008 | Kumano |
| 7,365,931 B2 | 4/2008 | Ikai |
| 7,371,708 B2 | 5/2008 | Arai et al. |
| 7,372,665 B1 | 5/2008 | Stoev et al. |
| 7,411,752 B2 | 8/2008 | Angelo |
| 7,417,820 B2 | 8/2008 | Otsuki et al. |
| 7,450,333 B2 | 11/2008 | Hirano |
| 7,508,612 B2 | 3/2009 | Biskeborn et al. |
| 7,518,818 B2 | 4/2009 | Yamazaki et al. |
| 7,561,368 B2 | 7/2009 | Kim et al. |
| 7,564,649 B2 | 7/2009 | Hanchi et al. |
| 7,593,187 B2 | 9/2009 | Aoki |
| 7,595,960 B2 | 9/2009 | Shimizu et al. |
| 7,616,398 B2 | 11/2009 | Gong |
| 7,623,322 B2 | 11/2009 | Umehara et al. |
| 7,626,144 B2 | 12/2009 | Merzliakov |
| 7,649,714 B2 | 1/2010 | Kato et al. |
| 7,692,888 B2 | 4/2010 | Duan |
| 7,692,898 B2 | 4/2010 | Hattori |
| 7,706,109 B2 | 4/2010 | Nichols et al. |
| 7,724,480 B1 | 5/2010 | Guo |
| 7,729,079 B1 | 6/2010 | Huber |
| 7,729,087 B1 | 6/2010 | Stoev et al. |
| 7,742,255 B2 | 6/2010 | Daugela |
| 7,760,457 B1 | 7/2010 | Gunderson |
| 7,773,346 B1 | 8/2010 | Guo |
| 7,787,201 B2 | 8/2010 | Alex |
| 7,787,207 B2 | 8/2010 | Takahashi |
| 7,796,356 B1 | 9/2010 | Fowler et al. |
| 7,800,858 B1 | 9/2010 | Bajikar et al. |
| 7,804,657 B1 | 9/2010 | Hogg et al. |
| 7,864,474 B2 | 1/2011 | Satoh et al. |
| 7,872,824 B1 | 1/2011 | Macchioni et al. |
| 7,903,365 B2 | 3/2011 | Watanabe |
| 7,929,249 B2 | 4/2011 | Seigler |
| 7,929,256 B2 | 4/2011 | Yamashita et al. |
| 8,049,984 B2 | 11/2011 | Contreras |
| 8,144,412 B2 | 3/2012 | Kiyono |
| 8,149,541 B2 | 4/2012 | Baumgart |
| 8,248,737 B2 | 8/2012 | Chen |
| 8,279,557 B2 | 10/2012 | Kautzky |
| 8,310,779 B2 | 11/2012 | Hanchi |
| 8,335,053 B2 | 12/2012 | Chen |
| 2002/0093753 A1 | 7/2002 | Atsumi |
| 2003/0002183 A1 | 1/2003 | Fioravanti |
| 2003/0058559 A1 | 3/2003 | Brand |
| 2004/0085670 A1 | 5/2004 | Li et al. |
| 2005/0174665 A1 | 8/2005 | Zhang |
| 2007/0133118 A1 | 6/2007 | Kajitani |
| 2007/0201154 A1 | 8/2007 | Ozeki |
| 2007/0206654 A1 | 9/2007 | Merzliakov |
| 2008/0080086 A1 | 4/2008 | Che |
| 2008/0100965 A1 | 5/2008 | Oki |
| 2008/0130152 A1 | 6/2008 | Kameyama |
| 2008/0225426 A1 | 9/2008 | Roy et al. |
| 2008/0225427 A1 | 9/2008 | Liu |
| 2008/0239581 A1 | 10/2008 | Ikai et al. |
| 2008/0247078 A1 | 10/2008 | Yao |
| 2008/0259480 A1 | 10/2008 | Pham |
| 2009/0021867 A1 | 1/2009 | Kondo |
| 2009/0153995 A1 | 6/2009 | Jang |
| 2009/0190260 A1 | 7/2009 | Kobatake |
| 2010/0007976 A1 | 1/2010 | Baumgart |
| 2010/0053815 A1 | 3/2010 | Komoriya |
| 2010/0157477 A1 | 6/2010 | Morinaga |
| 2011/0096440 A1 | 4/2011 | Greminger |
| 2012/0099218 A1 | 4/2012 | Kurita |
| 2012/0120519 A1 | 5/2012 | Kunkel et al. |
| 2012/0120521 A1 | 5/2012 | Kurita |
| 2012/0120522 A1 | 5/2012 | Johnson et al. |
| 2012/0120527 A1 | 5/2012 | Kunkel et al. |
| 2012/0120528 A1 | 5/2012 | Furukawa |
| 2012/0120982 A1 | 5/2012 | Anaya-Dufresne et al. |

OTHER PUBLICATIONS

International Search Report and Written Opinion from International Application No. PCT/US2011/061233 dated Feb. 28, 2012, 12 pages.
International Search Report and Written Opinion from International Application No. PCT/US2011/061236 dated Feb. 28, 2012, 11 pages.

* cited by examiner

DETECTION SYSTEM USING HEATING ELEMENT TEMPERATURE OSCILLATIONS

BACKGROUND

Data storage systems commonly include one or more recording heads that read and write information to a recording medium. It is often desirable to have a relatively small distance or spacing between a recording head and its associated media. This distance or spacing is known as "fly height" or "head-to-media spacing." By reducing the head-to-media spacing, a recording head is commonly better able to both read and write to a medium.

One factor that may improve the ability to reduce head-to-media spacing is the ability to determine or measure the head-to-media spacing and to detect when contact occurs. For instance, more accurate and/or more repeatable methods of determining head-to-media spacing may allow for head-to-media spacing to be reduced. Previous efforts to measure head-to-media spacing have included detecting increased vibrations associated with a recording head making physical contact with a recording medium.

SUMMARY

In one embodiment, a data storage system includes a recording head and a compensating resistor. The recording head has a heating element. The compensating resistor is in electrical series with the heating element and is external to the recording head.

In another embodiment, a method includes connecting a heating element in electrical series to a compensating resistor. An alternating current is applied to the heating element. A voltage drop across the heating element is measured. A voltage drop across the compensating resistor is measured. The voltage drop across the compensating resistor is subtracted from the voltage drop across the heating element.

In another embodiment, a method includes applying an alternating current at a first angular frequency to a recording head. A voltage drop across the recording head heating element is measured. A component of the voltage drop is extracted. The component has a frequency that is three times the frequency of the first angular frequency.

In yet another embodiment, an apparatus includes a magnetic recording head. The magnetic recording head has a metal element located near a close point between the magnetic recording head and an adjacent recording medium. The metal element functions as a combined heating element and temperature sensor.

These and various other features and advantages that characterize the claimed embodiments will become apparent upon reading the following detailed description and upon reviewing the associated drawings.

DETAILED DESCRIPTION

Embodiments of the present disclosure include devices and methods that may be useful in measuring or determining the head-to-media spacing in a data storage system. In an embodiment, a recording head includes a heating element that is powered by an alternating current. The alternating current causes the temperature of the heating element to oscillate. As will be explained in greater detail below, the amplitude of the temperature oscillations is dependent upon the distance between the recording head to its associated recording medium (i.e. the amplitude of the temperature oscillations is dependent upon the head-to-media spacing). For instance, in one embodiment, a recording head loses more heat when it is in contact with its recording medium (i.e. when the head-to-media spacing is zero) as compared to when the recording head is separated from its recording medium (i.e. when the head-to-media spacing is greater than zero). This is illustratively due to the fact that heat is transferred away from the recording head at a greater rate through the solid-to-solid contact that occurs when the head-to-media spacing is zero as opposed to the solid-to-gas contact that occurs when the head-to-media spacing is greater than zero. The differences in heat loss result in differing amplitudes of the temperature oscillations across the heating element. In at least certain embodiments, devices and methods are able to measure the amplitudes of the temperature oscillations and then utilize the amplitudes to determine recording head-to-media spacing.

Figure 1:
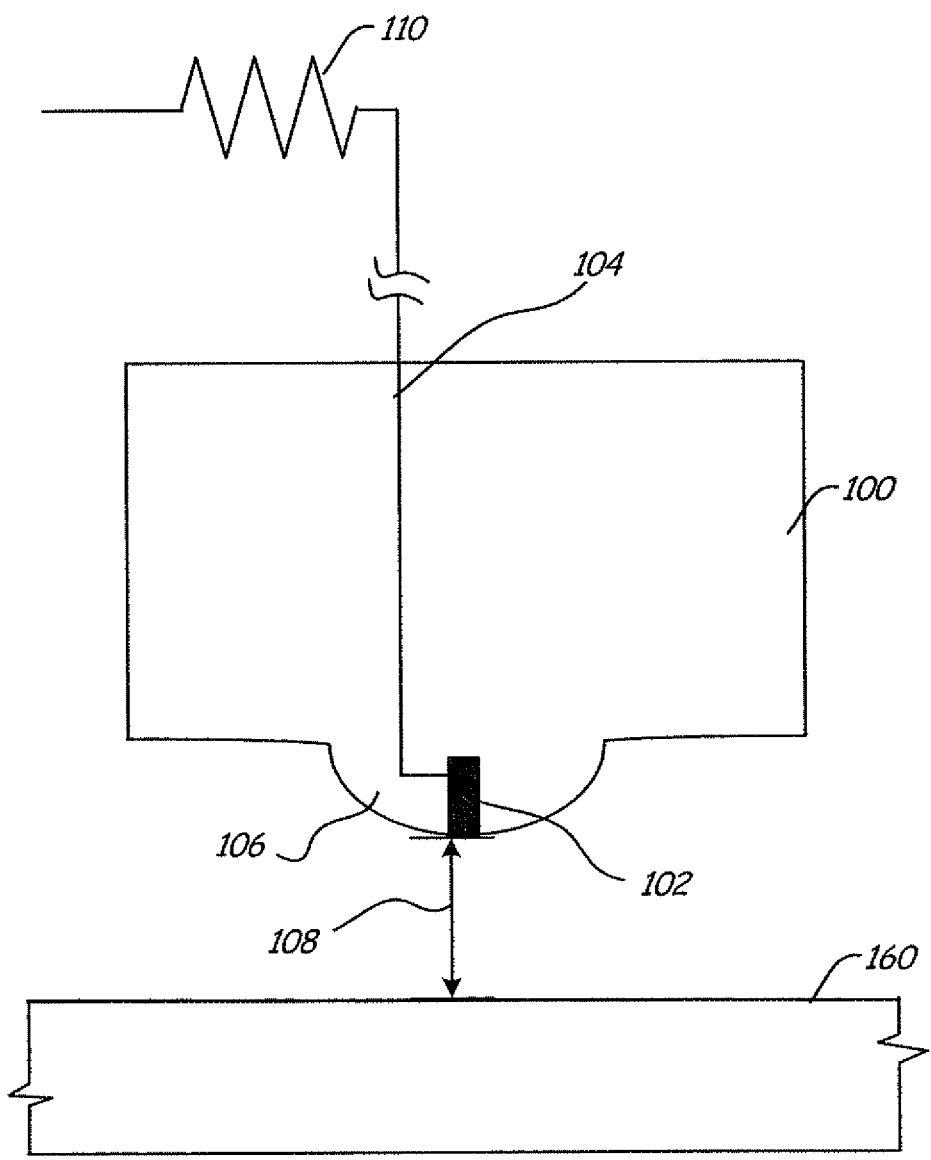
FIG. 1 depicts an embodiment with a head, heating element, and compensating resistor.

FIG. 1 is a schematic diagram of a cross-section of a recording head 100 and a recording medium 160 according to the present disclosure. Recording head 100 is illustratively carried by a slider, and medium 160 is illustratively a storage medium. FIG. 1 is a simplified diagram only showing cross-sectional views of some components of a recording head. Those skilled in the art will recognize that recording heads commonly include other components such as, but not limited to, insulating materials, read/write elements, and electrical connection points.

Recording head 100 optionally includes a heating element 102 that receives electrical current or power through a conductor 104. Heating element 102 is illustratively a resistive heater that generates thermal heat as electrical current is passed through the element. Heating element 102 is not however limited to any particular type of heating element and may include any type of heating element.

Heating element 102 passes thermal energy (i.e. heat) to surrounding portions 106 of recording head 100. The thermal energy causes a thermal expansion of the surrounding portions 106. This thermal expansion can be used for instance to reduce the head-media-spacing 108 in a data storage system. Also, as is described in greater detail below, in some embodiments, heating element 102 serves as both a heating element and as a temperature sensor, and may be located at a closest point of contact between recording head 100 and medium 160.

Heating element 102 is optionally connected in electrical series to an external compensating resistor 110. Again, as will be described in greater detail below, an electrical characteristic of the compensating resistor 110 (e.g. a voltage drop across the compensating resistor) may be used in approximating a head-to-media spacing 108 between recording head 100 and medium 160.

Figure 2:
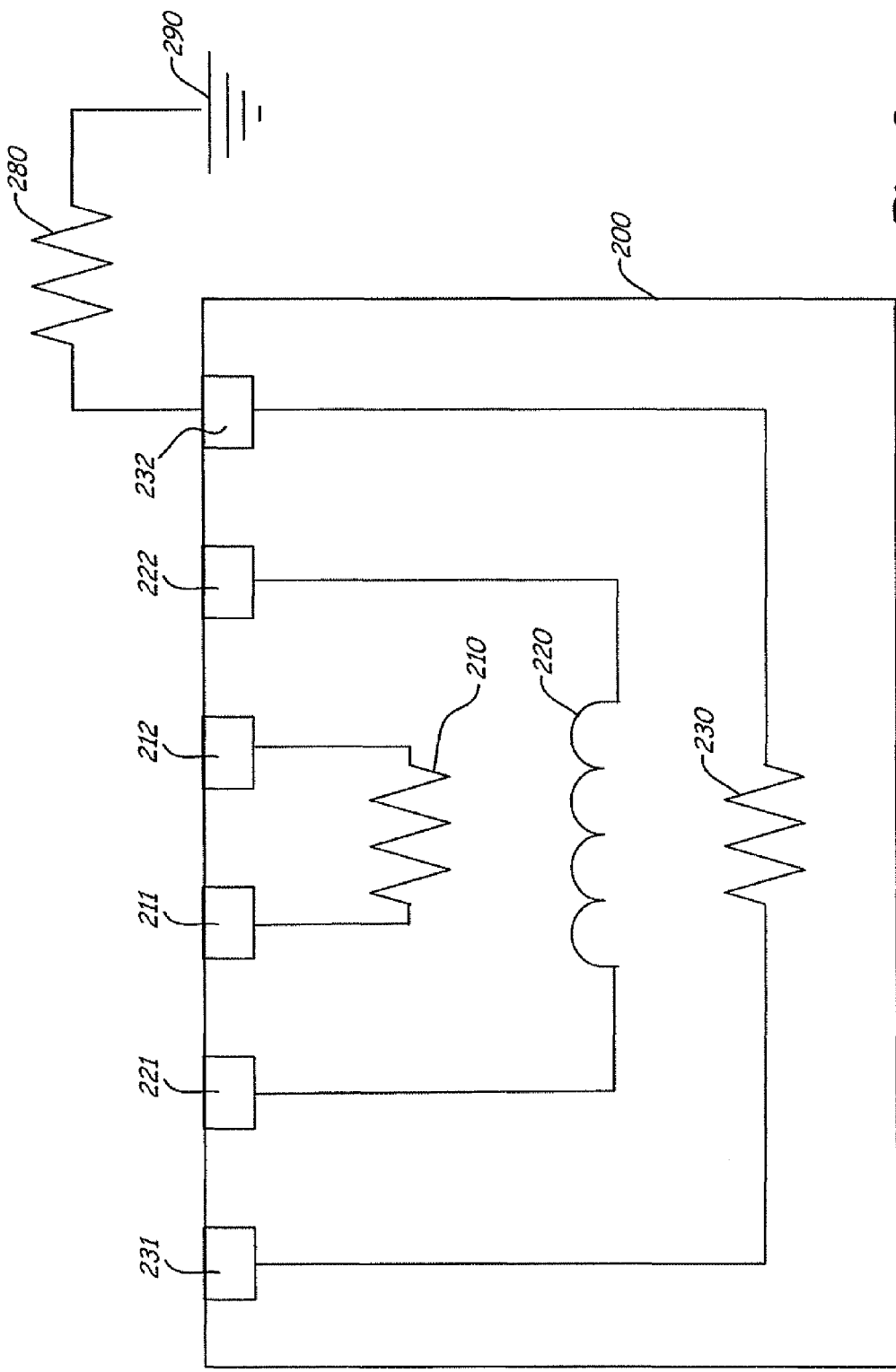
FIG. 2 is a schematic diagram of a recording head having a heating element.

FIG. 2 is a schematic diagram of a recording head system according to the present disclosure. FIG. 2 shows a recording head 200 electrically connected to an external compensating resistor 280 and ground 290. In some embodiments, external compensating resistor 280 can be located anywhere off of the recording head including on the flex beam, suspension arm, controller circuitry, or other printed circuit board (PCB). Recording head 200 includes a reading element 210, a writing element 220, and a heating element (i.e. a heater) 230. Embodiments of readers and writers are not limited to any particular configuration, and embodiments illustratively include heads having any type or configuration of reading and/or writing elements.

Heating element 230 is a resistive heating element. The resistance of heating element 230 illustratively varies linearly or approximately linearly with the temperature of the heating element. Heating element 230 is optionally made of a metal and is formed as a thin film, line, or wire on a recording head. In one embodiment, heating element 230 is placed at a location on the recording head such that it is the first part of the recording head to contact the recording medium when contact is made, or such that it is located close to the first part of the recording head that contacts the recording medium when contact is made (see FIG. 1). For example, heating element 230 is illustratively located on the air bearing surface of a recording head near writing element 220.

As is shown in FIG. 2, a resistor 280 is connected in electrical series to heating element 230 and is external to recording head 200 (i.e. resistor 280 is not part of the recording head). The resistance of resistor 280 is illustratively the same or approximately the same as the resistance of heating element 230. However, the resistance change of resistor 280 created by the heating current is negligible (i.e. the resistance of resistor 280 does not vary with the amplitude of the heating current as the resistance of heating element 230 does). In one embodiment, resistor 280 has a volume that is large enough such that its resistance change is negligible (e.g. a volume greater than 1 mm$^3$). Resistor 280 can also be made of a material with a temperature coefficient of resistance equal to zero or nearly zero. Embodiments of resistor 280 are not however limited to any particular type of resistor.

Recording head 200 further illustratively includes electrical connection points or pads 211, 212, 221, 222, 231, and 232 that enable the recording head components to be electrically connected or coupled to external electronic devices (e.g. a preamp, current source, and/or external resistor). FIG. 2 shows recording head 200 having six electrical connection points. Embodiments of recording heads are not however limited to any particular configuration or number or electrical connection points and may have more or less than the illustrated six, and some of these connection points may be combined in some instances.

Figure 3:
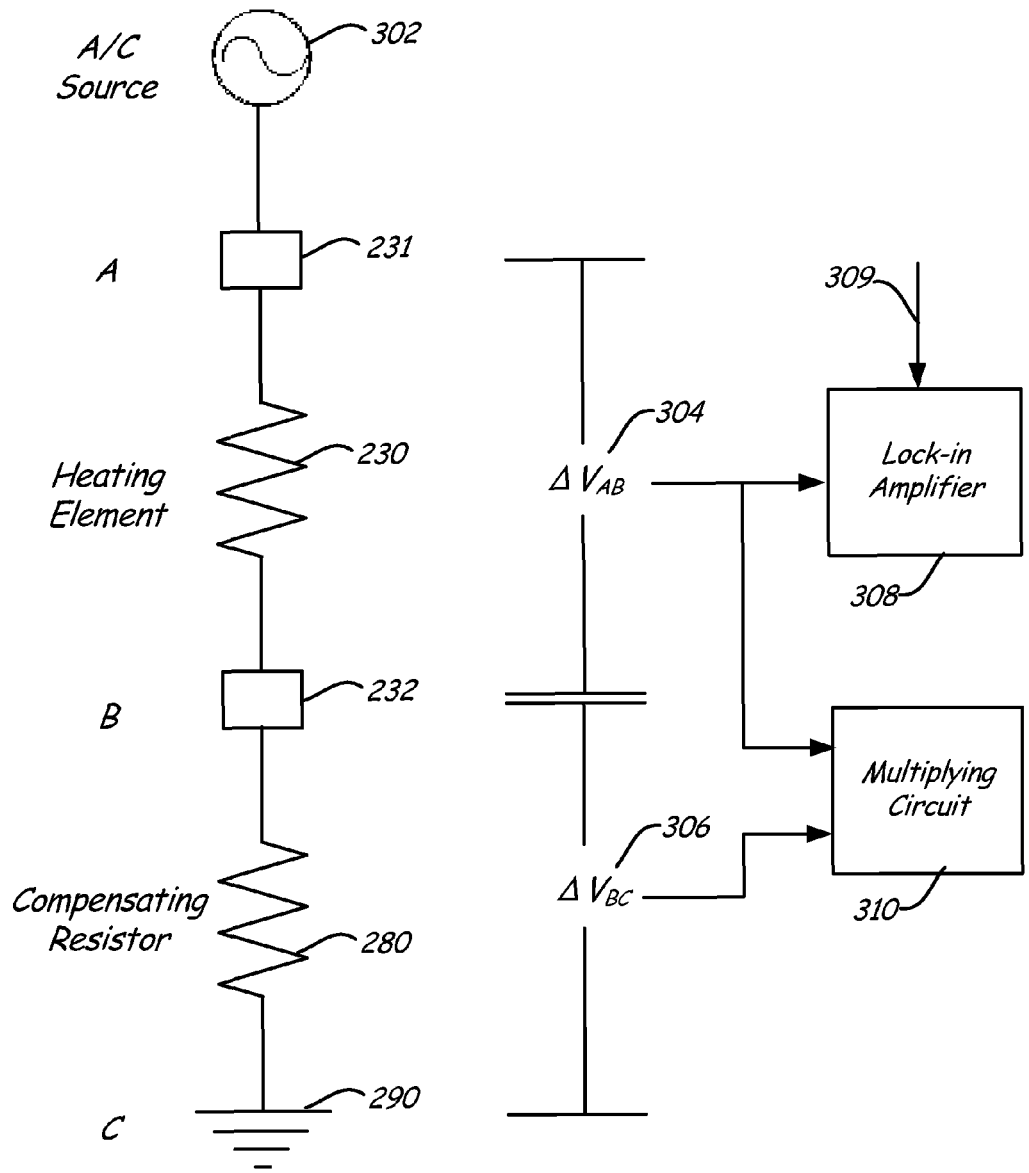
FIG. 3 is a schematic diagram of a heating element in electrical series with a compensating resistor.

FIG. 3 is an electrical diagram of the heating element 230 and external compensating resistor 280 during operation. Heating element 230 and resistor 280 are connected in electrical series and are powered by alternating current source 302. Current source 302 generates a voltage drop across heating element 230 that is labeled "$\Delta V_{AB}$" 304 and a voltage drop across compensating resistor 280 that is labeled "$\Delta V_{BC}$" 306. As will be described below, subtraction of the voltage drop across compensating resistor 280 from the voltage drop across heating element 230 leads to a voltage signal that can be correlated to head-to-media spacing.

The driving current in the circuit (i.e. the current from alternating current source 302 in FIG. 3) can be expressed by equation 1 below.

$$I(t)=I_0 \exp(i\omega t) \qquad \text{Equation 1}$$

In which, I(t) is the instantaneous current at time t, $I_0$ is the current amplitude, and $\omega$ is the angular frequency (e.g. radians/second).

The power in the heating element circuit can be expressed by equation 2 below.

$$P(t)=V(t)I(t) \qquad \text{Equation 2}$$

In which, P(t), V(t), and I(t) are the instantaneous power, voltage, and current, respectively, at time t for the circuit. The driving voltage, V(t), and current, I(t), are always either both positive or both negative, and hence the power, P(t), is always positive. It should also be noted that the resulting angular frequency of the power is twice that (i.e. at $2\omega$) of the driving current.

Figure 4:
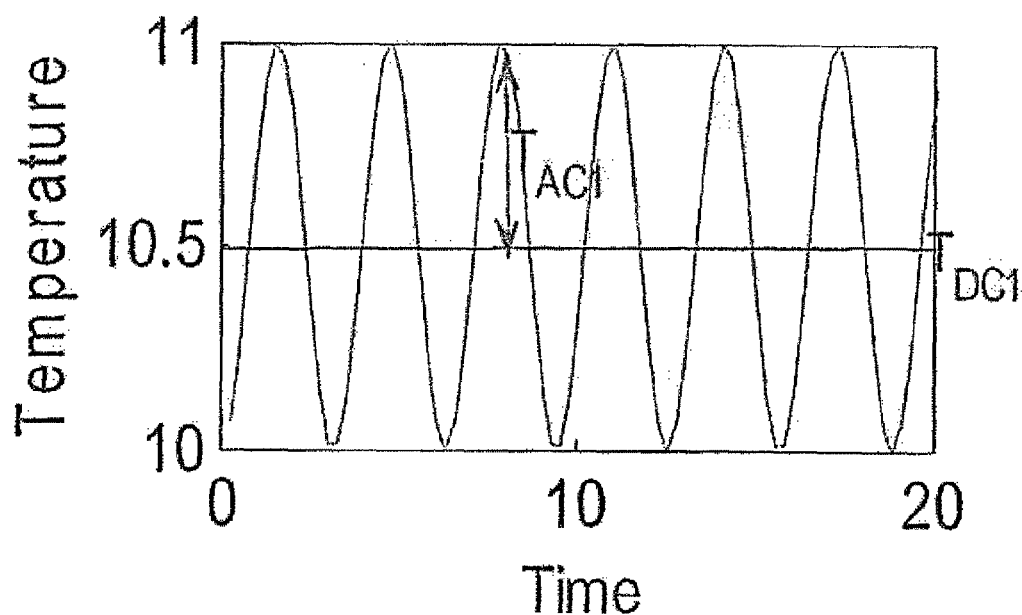
FIG. 4 is a graph of temperature oscillations of a heating element when the heating element is not in contact with a recording medium.
Figure 5:
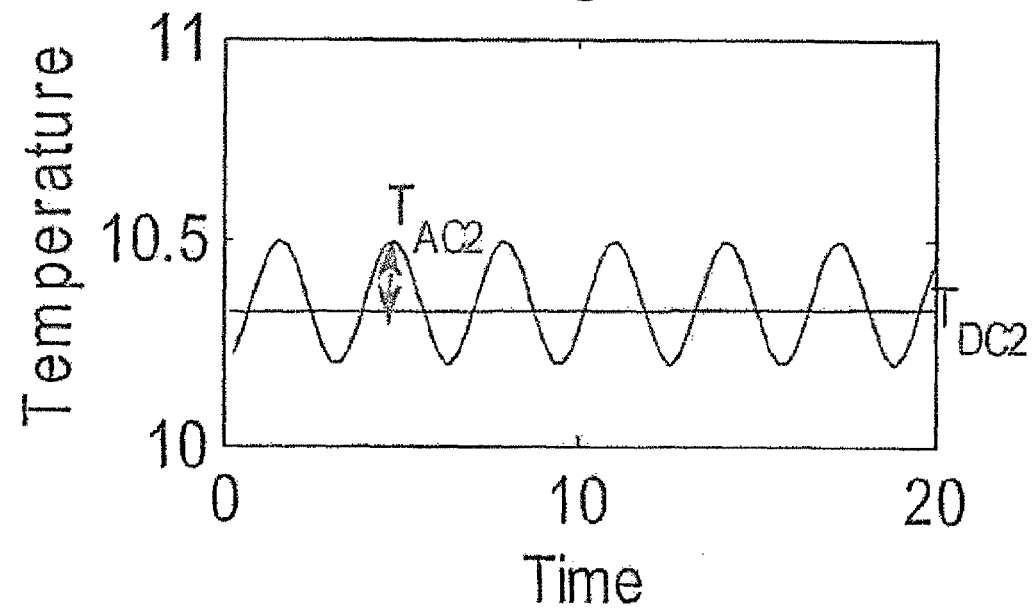
FIG. 5 is a graph of temperature oscillations of a heating element when the heating element is in contact with a recording medium.

FIGS. 4 and 5 are graphs of temperature oscillations of the heating element (e.g. element 230 in FIG. 2) as a function of time. FIG. 4 shows the temperature oscillations when the heating element and the recording medium are not in contact (i.e. the heating element is surrounded by gas), and FIG. 5 shows the temperature oscillations when the heating element and the recording medium are in contact. The temperature oscillations can be expressed by equation 3 below.

$$\Delta T=\Delta T_{DC}+\Delta T_{AC}\exp(i2\omega t) \qquad \text{Equation 3}$$

In which, $\Delta T_{DC}$ is the direct current component of the temperature rise and $\Delta T_{AC}$ is the amplitude of the alternating current component of the temperature oscillation.

There are several items worth noting from the graphs. First, the heating element temperature oscillates at an angular frequency that matches that of the power oscillations (i.e. the temperatures oscillate at $2\omega$). Second, the amplitude of the temperature oscillations when there is not contact (i.e. $\Delta T_{AC1}$ in FIG. 4) is greater than the amplitude of the temperature oscillations when there is contact (i.e. $\Delta T_{AC2}$ in FIG. 5). As was mentioned previously, heat is more quickly dissipated between the solid-to-solid contact that occurs when the heating element is in contact with a recording medium as compared to the rate of heat dissipation when the contact is solid-to-gas contact that occurs when the heating element is not in contact with the recording medium. Or, in other words, when the heating element is not in contact with the recording medium (i.e. FIG. 4), only a small amount of heat is conducted away from the heating element and $\Delta T_{AC1}$ is large. When the heating element is in contact with the recording medium, a larger amount of heat is conducted away from the heating element and $\Delta T_{AC2}$ is small. Finally, it should be noted that the resistance of the heating element (which varies linearly with temperature) oscillates at an angular frequency of $2\omega$ because the temperature of the heating element oscillates at an angular frequency of $2\omega$.

Figure 6:
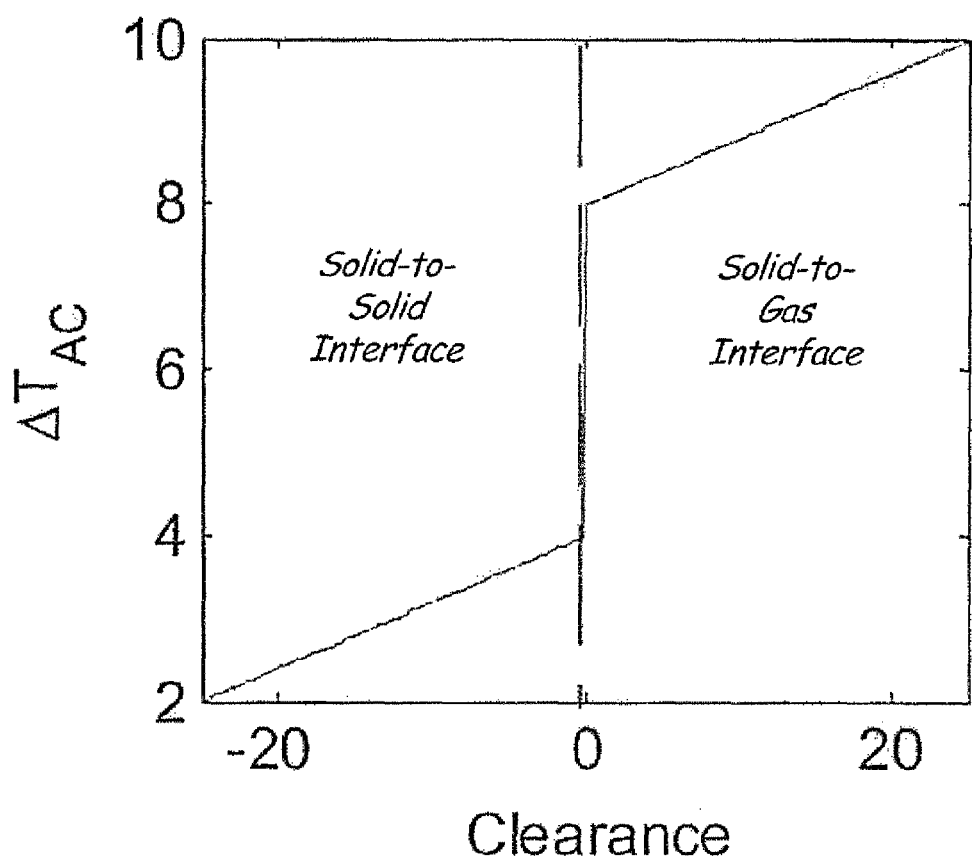
FIG. 6 is a graph of amplitudes of temperature oscillations as a function of head-to-media spacing.

FIG. 6 is a schematic diagram illustrating the relationship between the amplitude of temperature oscillations in a heating element (i.e. $\Delta T_{AC}$) and the head-to-media spacing. As can be seen in the graph, the amplitude decreases as head-to-media spacing decreases. Also, there is an abrupt change in amplitude as the heating element goes from a solid-to-solid heat transfer interface on the left side of the graph to a solid-to-gas heat transfer interface on the right side of the graph. Accordingly, head-to-media spacing values can be determined or at least approximated by determining the temperature oscillations of a heating element. For instance, the transition at zero clearance can be used to detect contact between a recording head and a recording medium.

Figure 7:
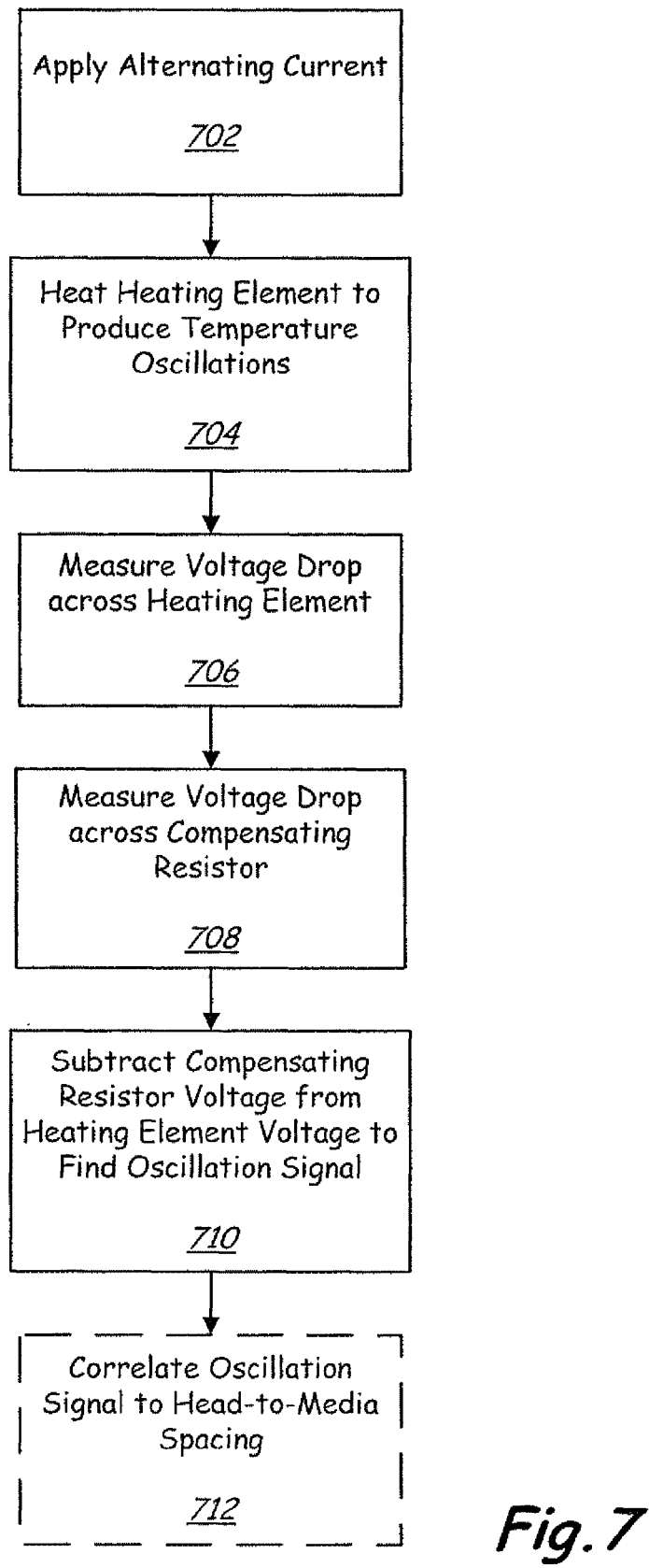
FIG. 7 is a process flow diagram of a method of determining temperature oscillations of a heating element.

FIG. 7 is a process flow diagram of a method of determining temperature oscillations of a heating element. The temperature oscillations are illustratively determined by measuring a voltage oscillation across the heating element. In some embodiments, a 3ω voltage oscillation is measured. At block 702, alternating current is applied to a circuit having a heating element and an external compensating resistor (e.g. the circuit shown in FIG. 3). In some embodiments, an alternating current at an angular frequency of 1ω is applied. At block 704, the alternating current heats the heating element to produce temperature oscillations in the heating element. In some embodiments, the temperature oscillations in the heating element occur at an angular frequency of 2ω. At block 706, the voltage drop across the heating element is measured. The resistance oscillation multiplied by the driving alternating current results in a voltage oscillation across the heating element (e.g. "$\Delta V_{AB}$" 304 in FIG. 3). In some embodiments, the resistance oscillation at 2ω multiplied by the driving alternate current at 1ω results in a voltage oscillation across the heating element at an angular frequency of 3ω. At block 708, the voltage drop across the compensating resistor (e.g. "$\Delta V_{BC}$" 306 in FIG. 3) is measured. As was previously mentioned, the resistance of the compensator is the same or approximately the same as that of the heating element except that its resistance does not vary too much or appreciably with the amplitude of the heating current. Hence, the voltage drop across the compensating resistor will be the same or approximately the same as the voltage drop across the heating element except that it will not include the voltage oscillation component (e.g. a 3ω component). At block 710, the voltage drop across the compensating resistor is subtracted from the voltage drop across the heating element to determine the voltage oscillation component of the heating element (e.g. a voltage oscillation component at 3ω). Optionally, at block 712, the voltage oscillation component is correlated to temperature oscillation which can then be correlated to a head-to-media spacing.

In one embodiment of the present disclosure, a lock-in technique/analysis is used to improve the signal-to-noise ratio of the 3ω oscillation component. This can be accomplished by either hardware or software methods (e.g. lock-in amplifiers 308 in FIG. 3 or IC demodulators) that receive a reference frequency 309 set at 3ω and extract the 3ω oscillation component of the heating element. In another embodiment, the signal-to-noise ratio of the 3ω oscillation component is improved by utilizing a multiplying circuit 310 before the voltage drop across the compensating resistor is subtracted from the voltage drop across the heating element (e.g. block 712 in FIG. 7). The multiplying circuit 310 can correct for errors and/or eliminate differences between the resistance of the heating element and the resistance of the compensating resistor (i.e. the multiplying circuit optionally corrects the resistance such that the only difference between the resistances of the heating element and compensating resistor is the 3ω oscillating component of the heating element resistance.

In yet another embodiment, the signal-to-noise ratio is further improved by optimizing the heating frequency. Optimization of the heating frequency can increase the sensitivity of the heating element to the surrounding thermal boundary conditions. The penetration depth of the thermal waves can be expressed by equation 4 below.

$$d = (D/\omega)^{1/2} \qquad \text{Equation 4}$$

In which, d is the penetration depth of the thermal waves, and D is the thermal diffusivity of the material. For a low heating frequency, the thermal penetration depth is large (i.e. a large volume of material around the heating element is heated). This results in the temperature rise of the heating element being less sensitive to the thermal boundary condition when the heating element is close to contact with the recording medium (i.e. as head-to-media spacing approaches zero). For a high heating frequency, the thermal penetration depth is small (i.e. a small volume of material around the heating element is heated). This results in the temperature rise of the heating element being more sensitive to the thermal boundary when the heating element is close to contact with the recording medium. Accordingly, relatively higher heating frequencies may be more desirable in determining head-to-media spacing. However, the heating frequency cannot be set to high to confine the heat to too small of a volume such that it excludes heat conduction contribution of the head-disk interface.

As has been described above, embodiments of the present disclosure provide devices and methods that may be utilized in determining/detecting head-to-media spacing or contact in data storage systems. Embodiments illustratively determine the spacing based upon an oscillating temperature of a heating element. Accordingly, embodiments do not rely upon vibrations as have previous efforts to detect spacing such as acoustic emission. Certain embodiments may also provide other advantages. For instance, the heating element in some embodiments serves both as a heater and a temperature sensor. Also for instance, head-to-media spacing determination can be improved by optimizing the driving/heating frequency, by utilizing signal subtraction (e.g. by utilizing a compensating resistor), and by utilizing a lock-in detection algorithm/system.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. A data storage system comprising:
   a recording head that has a heating element; and
   a compensating resistor that is in electrical series with the heating element and that is external to the recording head; and
   a multiplying circuit that compensates for a difference between the resistance of the heating element and a resistance of the compensating resistor.

2. The system of claim 1, wherein the heating element has a resistance that varies with temperature.

3. The system of claim 2, wherein the resistance of the heating element and a resistance of the compensating resistor are at least approximately equal.

4. The system of claim 1, further comprising:
an alternating current source that powers the heating element.

5. The system of claim 1, further comprising:
a lock-in amplifier that extracts a portion of a voltage signal from the heating element.

6. The system of claim 1, further comprising:
a recording medium; and
wherein the heating element is located on the recording head such that it is the closest portion of the recording head to the recording medium.

7. The system of claim 1, wherein the heating element comprises a metal wire or film and also functions as a temperature sensor.

8. A method comprising:
connecting a heating element in electrical series to a compensating resistor;
applying an alternating current to the heating element;
measuring a voltage drop across the heating element;
measuring a voltage drop across the compensating resistor;
subtracting the voltage drop across the compensating resistor from the voltage drop across the heating element.

9. The method of claim 8, wherein the alternating current is applied at an angular frequency of 1ω, and wherein the voltage drop across the heating element has a 3ω component that oscillates at 3ω.

10. The method of claim 9, further comprising:
extracting the 3ω component from the difference between the voltage drop across the heating element and the voltage drop across the compensating resistor.

11. The method of claim 10, further comprising:
utilizing a lock-in technique to extract the 3107 component.

12. The method of claim 10, further comprising:
correlating the 3ω component to a head-to-media spacing.

13. The method of claim 8, further comprising:
utilizing a multiplying circuit to compensate for resistance differences before subtracting the voltage drop across the compensating resistor from the voltage drop across the heating element.

14. The method of claim 9, further comprising:
optimizing the angular frequency based at least upon a thermal diffusivity of a material around the heating element utilizing an equation:

$$d=(D/\omega)^{1/2}$$

in which, d is a penetration depth of thermal waves, and D is a thermal diffusivity of the material around the heating element.

15. A method comprising:
apply an alternating current at a first angular frequency to a recording head heating element;
measuring a voltage drop across the recording head heating element; and
extracting a component of the voltage drop, the component having a frequency that is three times the frequency of the first angular frequency.

16. The method of claim 15, further comprising:
correlating the component to a temperature or to a head-to-media spacing.

17. The method of claim 15, further comprising:
applying the alternating current to a resistor that is external to a recording head; and
measuring a voltage drop across the resistor.

18. An apparatus comprising:
a magnetic recording head including a metal element located near a close point between the magnetic recording head and an adjacent recording medium, the metal element functioning as a combined heating element and temperature sensor; and
a compensating resistor that is in electrical series with the metal element and that is external to the recording head, wherein the resistance of the metal element and a resistance of the compensating resistor are at least approximately equal.

19. The apparatus of claim 18, further comprising:
an alternating current source providing a current with angular velocity ω to the metal element; and
a signal processor that removes a background voltage oscillation from a metal element generated temperature oscillation and demodulates an amplitude of the background voltage oscillation.

* * * * *

UNITED STATES PATENT AND TRADEMARK OFFICE
CERTIFICATE OF CORRECTION

| | | |
|---|---|---|
| PATENT NO. | : 8,523,312 B2 | Page 1 of 1 |
| APPLICATION NO. | : 12/941461 | |
| DATED | : September 3, 2013 | |
| INVENTOR(S) | : Zheng et al. | |

It is certified that error appears in the above-identified patent and that said Letters Patent is hereby corrected as shown below:

In the Claim

Column 7, line 32, Claim 11: "extract the 3107 component" should read --extract the $3\omega$ component--.

Signed and Sealed this
Tenth Day of December, 2013

Margaret A. Focarino
*Commissioner for Patents of the United States Patent and Trademark Office*